United States Patent [19]

Griffin et al.

[11] Patent Number: 5,265,173
[45] Date of Patent: Nov. 23, 1993

[54] RECTILINEAR OBJECT IMAGE MATCHER

[75] Inventors: Arthur F. Griffin, Culver City, Calif.; Caesar P. Ancheta, Brookfield, Wis.

[73] Assignee: Hughes Aircraft Company, Los Angeles, Calif.

[21] Appl. No.: 674,274

[22] Filed: Mar. 20, 1991

[51] Int. Cl.[5] .............................................. G06K 9/48
[52] U.S. Cl. ......................................... 382/22; 382/1; 358/109
[58] Field of Search .................... 382/22, 1, 69, 23, 24, 382/25, 26, 27, 28; 358/107, 109

[56] References Cited

U.S. PATENT DOCUMENTS

| | | | |
|---|---|---|---|
| 3,636,513 | 1/1972 | Tisdale | 382/1 |
| 4,490,848 | 12/1984 | Beall et al. | 382/25 |
| 4,499,598 | 2/1985 | Chittineni | 382/22 |
| 4,783,828 | 11/1988 | Sadjadi | 382/22 |
| 4,974,077 | 11/1990 | Kusaba | 358/107 |
| 5,007,098 | 4/1991 | Kumagai | 382/22 |
| 5,093,869 | 3/1992 | Alves et al. | 382/22 |

Primary Examiner—Leo H. Boudreau
Assistant Examiner—D. R. Anderson
Attorney, Agent, or Firm—Terje Gudmestad; Michael W. Sales; W. K. Denson-Low

[57] ABSTRACT

A process for extracting the precise perimeter of buildings from down-looking terrain images. The process works for any rectilinear building shape, and no restrictions are placed on the orientation or scale of the buildings within an image. The process has the advantages of robustness and execution speed. The process is robust in that it can extract building perimeters from a digitized image in the presence of multiple noise sources. The execution speed is proportional to N+M, where the size of the image is N by M pixels.

30 Claims, 9 Drawing Sheets

RECTILINEAR OBJECT IMAGE MATCHER

BACKGROUND OF THE INVENTION

The present invention relates to a method for extracting the precise perimeter of buildings from down-looking terrain images without significant manual operations.

There are many features extraction techniques in the computer vision and image processing literature that could be applied to building perimeters. These techniques are collectively called object matching and can be summarized as four basic approaches:

1. Linking line segments. This is a bottom-up approach that extracts low level features, such as lines, and attempts to combine the lines to construct complex objects. The disadvantage is that the low level extraction is very susceptible to image noise and scene variation resulting in both missing important lines and including extraneous lines. Unlike the process of the present invention, low level extraction does not consider global constraints, such as the impact of building size, on including or excluding a line as a side. There are too many possible line segment combinations to consider. An example of this bottom-up approach is the Rectilinear Line Grouping System, University of Massachusetts, Amherst as reported in *IEEE Computer*, Dec. 1989, p. 28. The resulting building perimeters consist of unconnected line segments in which many walls are missing. Another disadvantage is speed. Extracting these low level feature for the entire image is computational expensive (proportional to N*M, the product of the image's dimensions) making the process too slow for many real-world applications.

2. Library of object models. This approach requires matching the image against a library of stored building perimeter shapes. State-of-the-art library matching approaches generally allow for variation in orientation and scale but not shape. This approach is appropriate when there is a finite number of objects that must be recognized such as letters of the alphabet. If a shape is not included in the library, the image cannot be matched. Thus, this approach will not accommodate generalized rectilinear buildings since the number of possible rectilinear shapes is infinite. Also, alphabet character recognition systems only classify objects, e.g., this is an "A," but not to determine their precise perimeters.

3. Parameterized object models. The size, shape and location of the matching model is controlled by the numerical values of parameters. An example of this approach is finding circle shapes in medical X-ray images as cited in Ballard and Brown, *Computer Vision*, 1982, Prentice Hall, p. 126. There were two parameters: center location and radius. This approach works only with relatively simple geometric shapes.

4. Segmented object models. Rather than trying to match complete objects, this approach attempts to match a relatively small number of generic object components. One such system looks for right angle corners and straight line segments by matching generic corner and straight line templates. These templates have a fixed scale so that only a small range of building sizes can be matched. The corners of larger scale buildings or noisy building images would appear to be rounded contours and would not be recognized as corners.

A generalized description of curve, or contour, following is given by Azriel Rosenfeld, *Digital Image Processing*, 2nd Ed., v. 2, Academic Press, 1982, pp. 130–138; chapter 11 is a survey of representations of image features, such as connectedness, size and shape. Representation of the traversal of an arbitrary digitized plane curve by chain codes was given by Herbert Freeman, *IRE Transactions*, EC 10 (1961) pp. 260–268. An alternative encoding for chain codes was given by Kenneth C. Knowlton, *Proc. Spring Joint Computer Conference*, 1964, pp 67–87. Efficient encoding of pixel neighborhood patterns for use in a contour follower was give by Irwin Sobel, *Computer Graphics and Image Processing*, v. 8, 1978, pp. 127–135. However, none of these sources mention the stopping condition, multiply-connected pixels, or use of multiple image data sets comprising the present invention.

SUMMARY OF THE INVENTION

A method and system is described for extracting the perimeters of buildings from down-looking terrain images comprising $N \times M$ pixels in a rectilinear pixel grid. The method comprises a sequence of the following steps:

processing the image to obtain building regions which are candidates for buildings and to provide a binary image representation wherein pixels comprising the building regions have a value of one and pixels not comprising the building regions have a value of zero;

testing the vertical and horizontal dimensions of each building region against a set of prototype building dimensions, and judging a building region not to be a building if the dimensions of the region are too small or too large;

operating on the binary image representation to provide a list of x-y pixel coordinates of the contour of each candidate building region comprising the terrain image;

aligning the principle axes of each building region contour with respect to the pixel grid of the binary image;

calculating vertical and horizontal edge direction histograms of the aligned building region contour list;

testing the peak concentration ratio of the histograms against preset threshold and judging the building region not to be a building if the ratio is less than the threshold;

using peaks in the edge histograms to hypothesize corner candidates of the building region pixel coordinate list;

selecting different combinations of corner candidates, testing each combination as a valid perimeter by attempting to connect the corners of each combination to form a closed, continuous perimeter and discarding each combination which cannot be so connected; and selecting as the building perimeter that validated combination of corner candidates with the greatest number of corner candidates.

The method can further include the step of comparing the height of a selected building region against a height threshold and judging the candidate building region not to be a building if the height of the building is close to ground level.

An important advantage of the invention is that it does not require any restrictions on the number of rectilinear building sides, configuration of sides, and size of buildings.

Another advantage in the method of this invention is a contour follower which can accommodate very noisy and convoluted contours, whereas the prior art cannot.

Yet another advantage of a method embodying this invention is speed. The execution time of image processing techniques in general is proportional to N*M, where the size of the image is N by M pixels. The present process is significantly faster with execution speed proportional to N+M. For 2000×2000 pixel images, the speed advantage is on the order of 1000.

BRIEF DESCRIPTION OF THE DRAWING

These and other features and advantages of the present invention will become more apparent from the following detailed description of an exemplary embodiment thereof, as illustrated in the accompanying drawings, in which:

FIG.6C illustrates the adjustment of the bin size in determining the value of Theta resulting in the maximization of Rho using the Hough transform.

DETAILED DESCRIPTION OF THE PREFERRED EMBODIMENT

The process of the present invention accomplishes two major requirements: (1) to identify what regions of the image are buildings and (2) to recover an idealized rectilinear building perimeter (straight walls and right-angle corners) from multiple sources of noise in the digitized image.

The major paradigm of this process is "hypothesize and test" which is applied at various stages of processing. At the beginning, segmented regions of the image are hypothesized as candidates for buildings. Then these regions are tested by comparing them against known characteristics of building images. Toward the end of the process, corners of a building are hypothesized. Different combinations of corner candidates are then tested by attempting to connect them to form a closed, continuous perimeter.

Figure 1A:
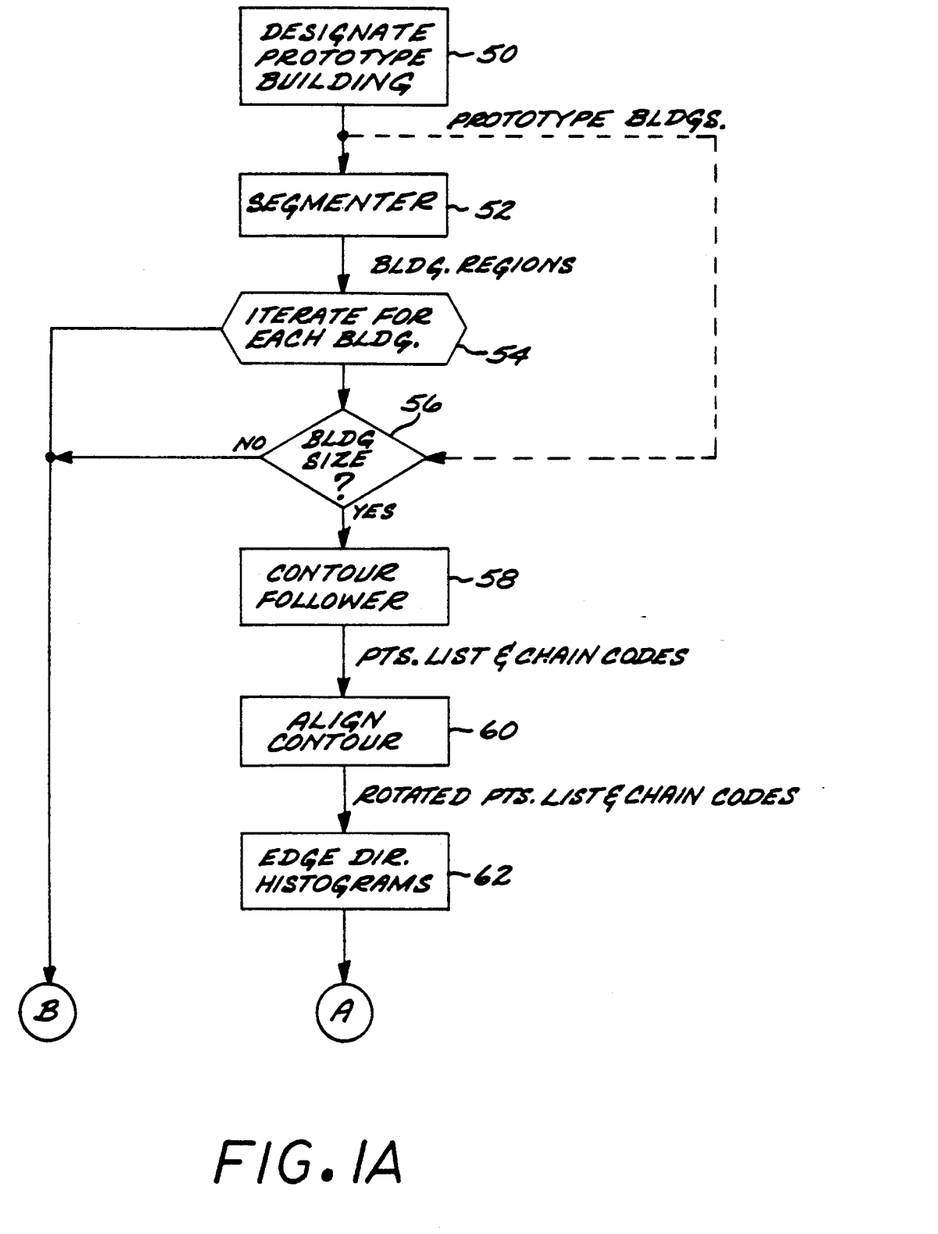
FIG. 1A-1B are simplified process flow charts illustrative of the present invention.
Figure 1B:
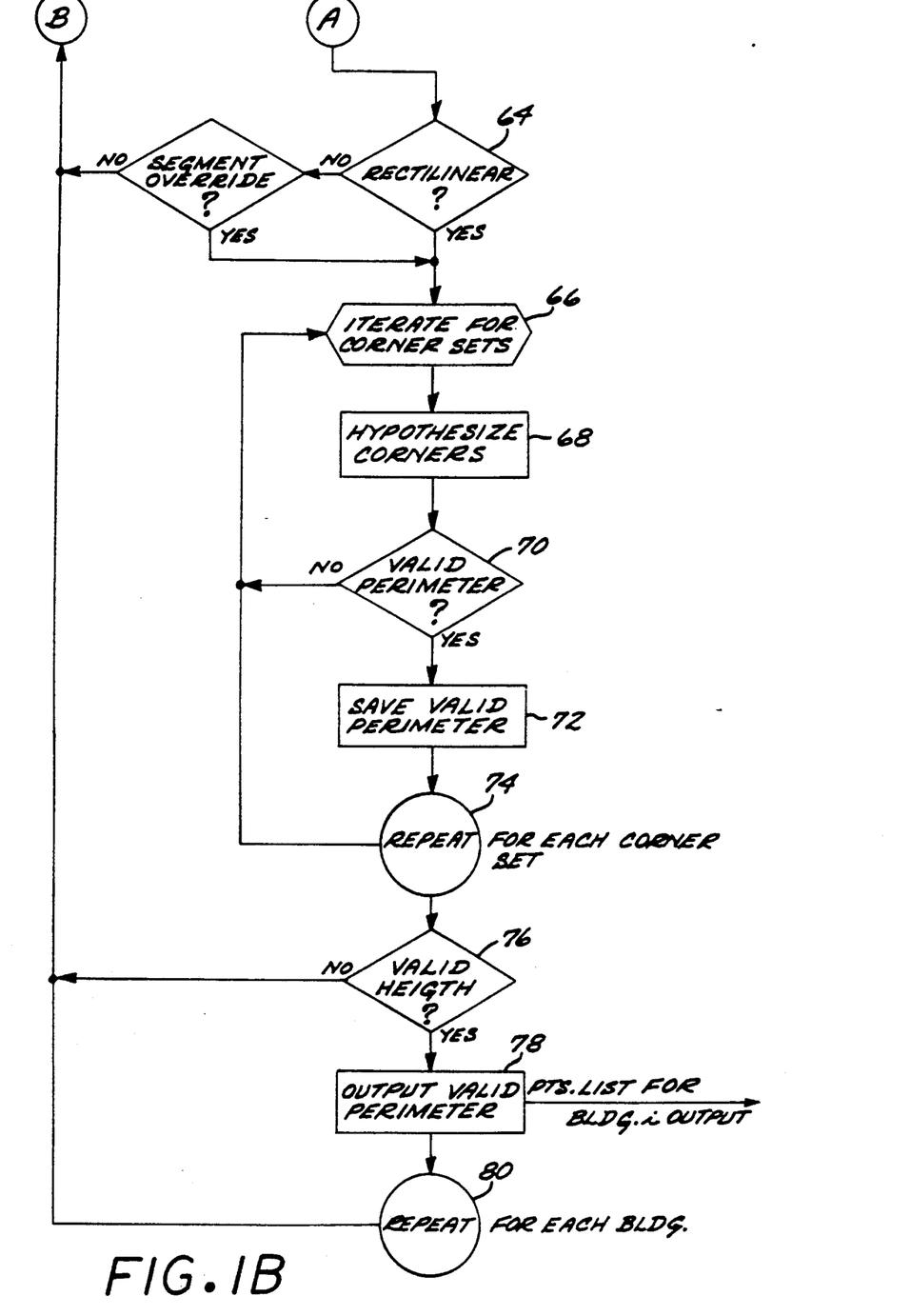

FIGS. 1A-1B are flow charts illustrative of an exemplary embodiment of a process embodying the invention for extracting building perimeters from 2-D images. This combination of steps successfully constrains the number of hypotheses that are generated and tested. In any real-world feature extraction application, the number of possible hypotheses to be tested, and hence the amount of computation required, is prohibitively large. Constraining the number of candidates considered is the central issue in implementing a practical hypothesize and test approach.

The ten general steps in the exemplary process embodying the invention are outlined below.

Figure 2A:
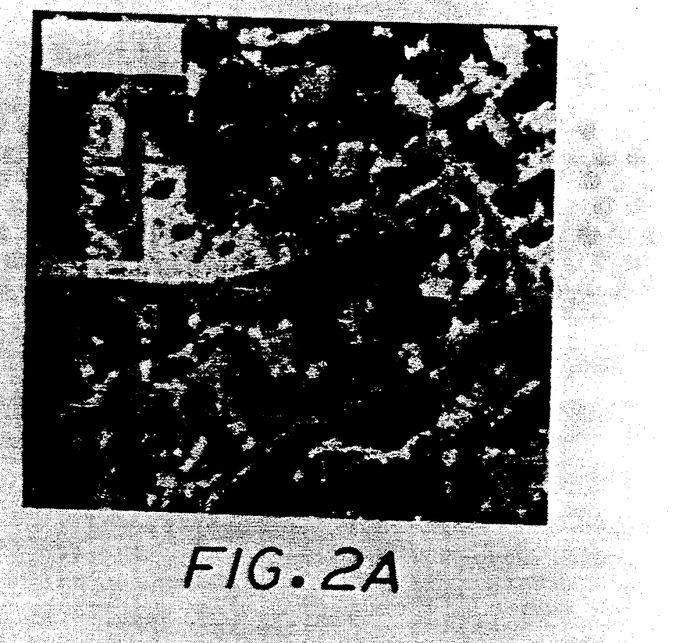
FIGS. 2A-2D illustrate building feature extraction in accordance with the invention.

An initial step 50 is to designate prototype buildings. A digitized down-looking, or vertical, terrain image is displayed on a CRT display. A human operator uses a pointing device to designate the location and size of several typical buildings. These areas in the image are saved in memory to be used in subsequent steps as prototypes of valid buildings. Statistics describing the buildings are calculated from the interactive inputs, e.g., means and standard deviation of building size. This process is repeated for one or more other images from which a data base is being built. The number of images for which the user is asked to repeat this part of the process is determined from the variation in building size and variations in pixel intensity within the building perimeter and between the building and its surroundings. The output of this step 50 is the building prototype footprints and building statistics. FIG. 2A illustrates a typical image which is digitized to serve as the input for this step.

Figure 3:
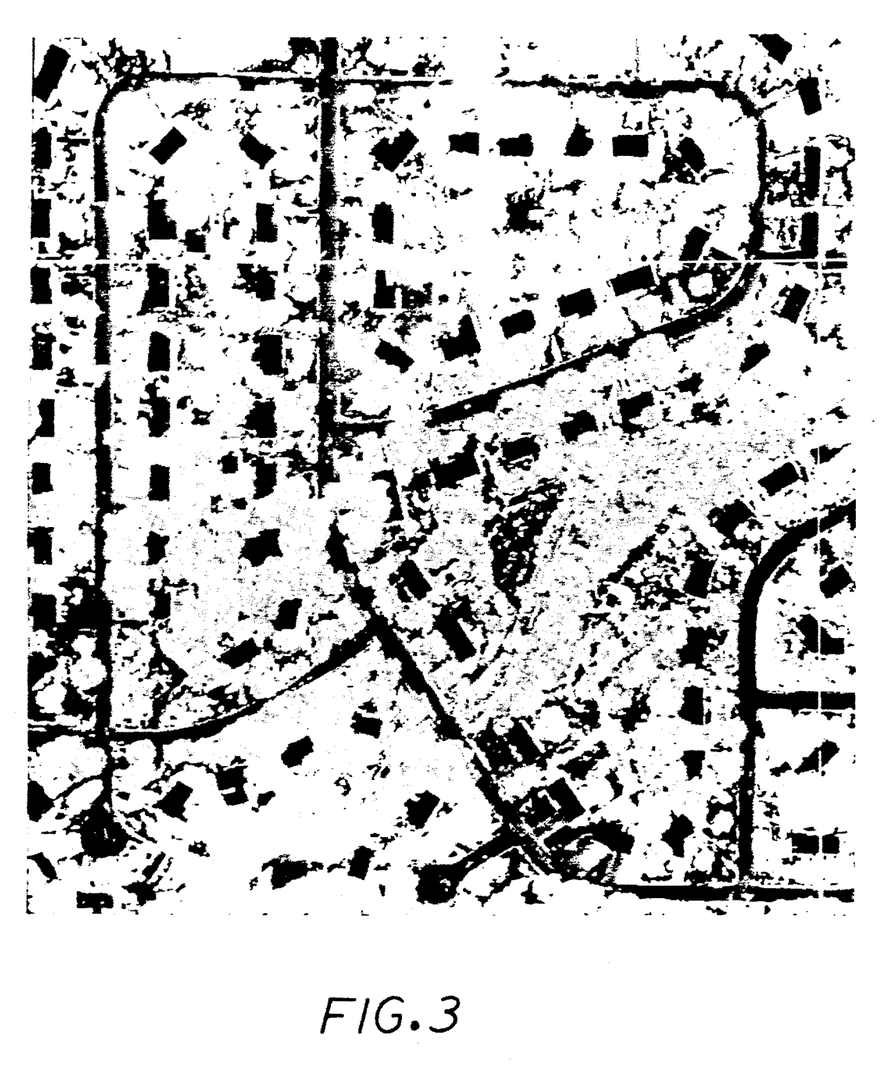
FIG. 3 illustrates a test image of buildings after segmentation.

After the initializing step has been completed, the system is ready to process a digitized image. The next step 52 is the segmenter step, wherein building regions are hypothesized. Each terrain image is segmented into different regions based on pixel intensity of one or more color channels, or ratios of intensities between channels. Adjacency rules and the building prototypes are then used to combine regions that constitute candidates for buildings. For example, if a current region has a roof color and is adjacent to a rectilinear region with a shadow color, then the current region is likely to be a building. Subsequent processing may reject some of these hypothesized buildings. There are many known ways that this step may be accomplished. By way of example, one commercially available software program usable to perform the segmenting step is the "KBVision" program marketed by Amerinex Artificial Intelligence, Inc., 274 Amherst, Mass. An exempary output of the segmenting is illustrated in FIG. 3, where hypothesized building pixels are black. Once the building regions are segmented, they are passed through a filtering to retain only the edges of each building region. Such filtering is described, e.g. in *Digital Image Processing*, id. at chapter 11. Detection of the edge pixels is straightforward. The entire bit mapped image can be systematically examined, pixel-by-pixel, row-by-row and column-by-column, and compared to its surrounding pixel neighbors to determine whether the pixel lies on the edge of a building. If it does not, the pixel value is set to zero. After this filtering, the bit-mapped image will be of a one-pixel-wide skeletal outline. The output of step 52 is a binary skeletal image where building pixels have a value of 1 and non-building pixels are 0.

The next set of functions are iterated (step 54) for each building of the digitized image. The first test of a building region is a size test (step 56). The horizontal and vertical dimensions of each region are tested. If a region is either too small or too large as compared with the size of the prototype buildings from step 50, then it is judged not to be a building, and operation proceeds to the next building region via step 54.

Figure 2B:
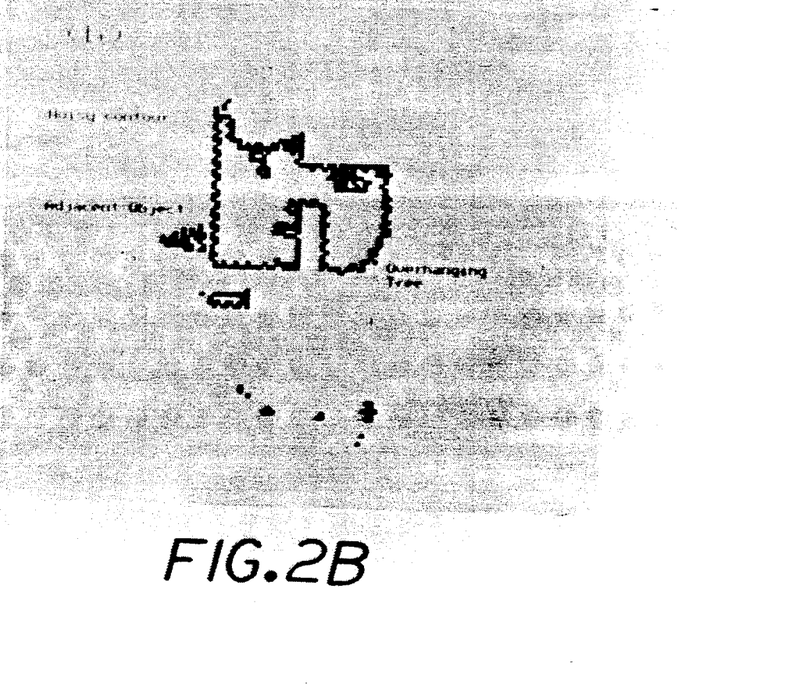
Figure 2C:
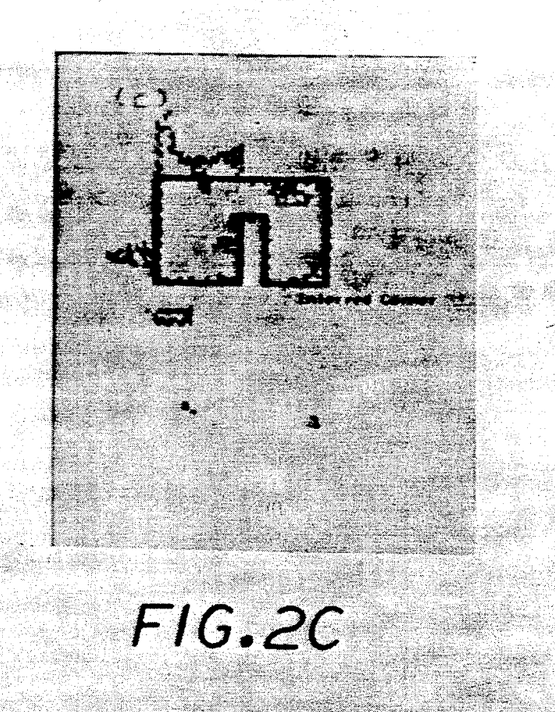

If a building region contour falls within the expected size, then at step 58 the contour of the building region is traced (Contour Follower 58). The contour follower operates on the binary image from step 52 to produce a list of x-y pixel coordinates of the contour of each candidate building in an image. Each contour will contain noise from various sources. For example, some parts of the building perimeter, including corners, may be missing, obscured by overhanging objects such as trees. Other noise sources include aliasing inherent in a digitized image, fuzzy building edges due to atmospheric diffraction of light, minor building features and adjacent non-building objects. The contour follower in accordance with the invention has the ability to trace very noisy and convoluted contours, and is described in more detail below. FIG. 2B illustrates the output of this step.

In step 60 the building contours of the building are aligned with the image pixel grid. A routine determines the angle of the building contour's principle axes with respect to the pixel grid of the image. The building contour is then rotated through this angle so that it is aligned with the pixel grid. The building's orientation angle can be determined with accuracy and speed by this step.

In step 62 edge direction histograms are calculated. Having aligned the contour in the previous step, it is straight forward to determine horizontal and vertical edge direction histograms for a building contour. This step employs edge histograms which provide an efficient representation of the context for the entire contour from which the most likely corners can be precisely located.

Step 64 is a second test of building regions, a test for rectilinearity. The presence of sharp peaks in the edge direction histograms is used as another validation test for a candidate building contour. If the peak concentration ratio of the histograms is larger than a preset threshold, then the contour is further validated as a building. The rectilinear concentration ratio of the edge histogram provides a reliable and easy-to-calculate metric for recognition of rectilinear objects. If the particular contour fails to meet this test, then operation returns to step 54 to process the next building region.

If the building region passes the rectilinearity test, then at step 68, the building corners are hypothesized. Peaks in the edge histograms are used to locate likely straight wall segments of the perimeter. The intersection of these likely walls locates the corner candidates of the buildings, even if a corner is obscured in the image.

The next step 70 is to test building corner candidates. Based on the amplitude of each peak in the edge histograms, different combinations of corner candidates are selected. Each combination of corners is validated by attempting to connect the corners to form a closed, continuous perimeter. If a set of corner candidates cannot be connected, it is discarded as a possible perimeter (step 70). Each valid perimeter is saved (stored in memory) at step 72. This provides the ability to efficiently recover the most complex perimeter that can be supported by the rectilinear contour connectivity present in a noisy image.

A third test (76) of the building regions, for height, is optional. If stereo image pairs are available, then height of the candidate contour is used as a final building validation. Steps 50-74 above are performed on each image of the stereo pair. The parallax between the corresponding contours in each image is computed using photogrammatic techniques, for which no claim of novelty is made. (Stereo pair analysis is a standard step in prior art processes.) The elevation of the imaged object contour is proportional to the parallax. Thus, if the object's height is close to ground level the contour cannot be a building and the hypothesis is eliminated. This final test discriminates against ground level objects such as concrete slabs which may otherwise have the appearance of a building in a downlooking image.

Figure 2D:
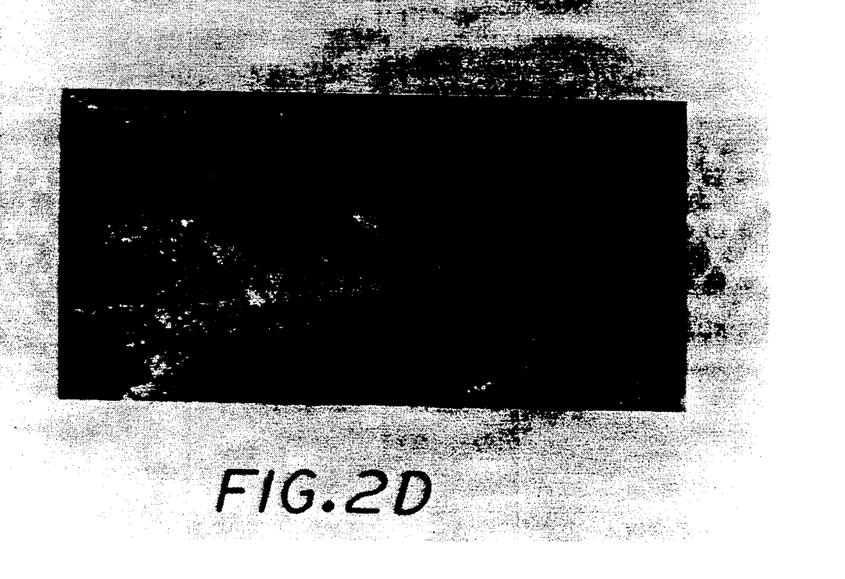

The final results of this process are illustrated in FIG. 2D. This is a perspective rendering of a building image whose perimeter has been extracted in accordance with the invention.

DETAILS OF PROCESS STEPS

Contour Follower (Step 58)

Figure 4:
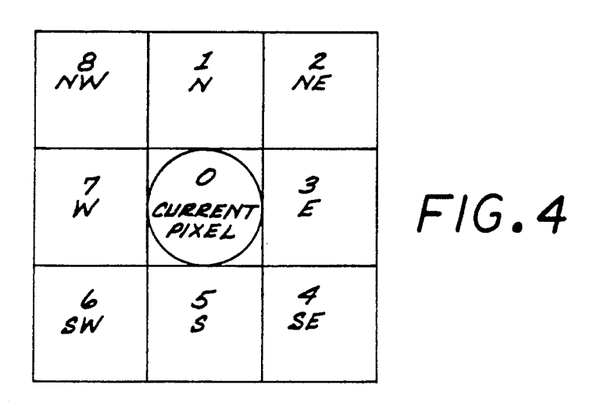
FIG. 4 illustrates the eight neighbor pixel mask for chain coding the buildings.

The contour follower (step 58) in this embodiment converts a raster bit map into a continuous contour in the form of a list of chain codes and a list of x, y pixel coordinates. Each pixel in the contour is assigned a chain code that gives the direction of the next pixel in the contour. The direction codes used in the exemplary implementation are shown in FIG. 4.

Chain codes are a well-known technique to represent contours. The uniqueness of the present approach is the use of multiple look-up tables to determine the direction of the next pixel in the contour, given the pattern of the eight neighbors of the current pixel.

To start the contour follower process, the digitized binary image is scanned from pixel (0,0) left to right, top to bottom, until the first non-zero pixel is found. This becomes CP(0), the top-most, left-most non-zero pixel. The x, y location of CP(0) is saved.

Figure 5A:
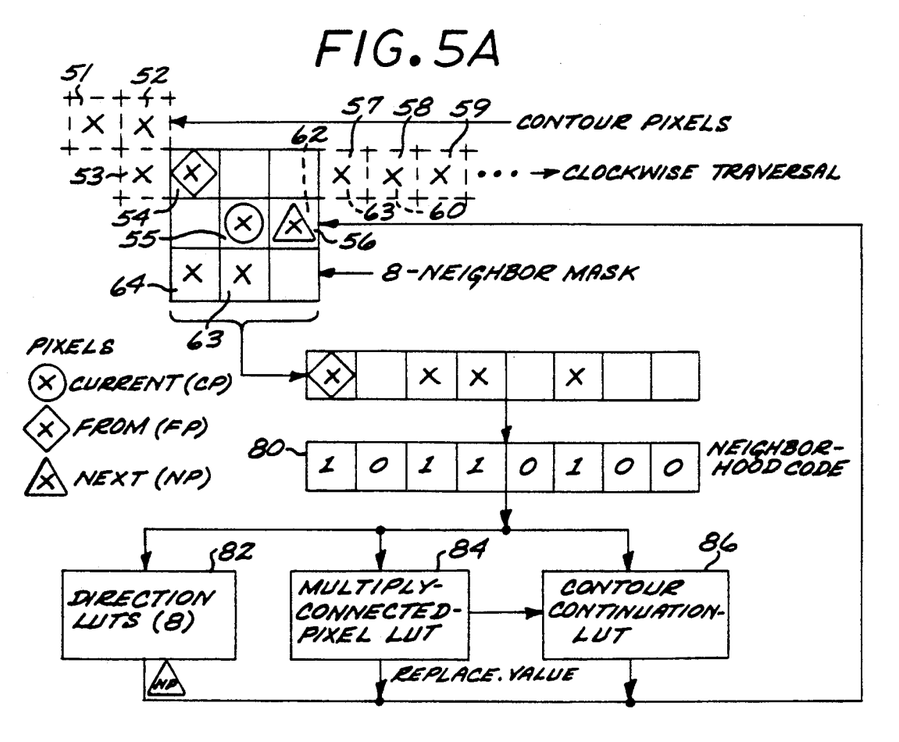
FIGS. 5A and 5B illustrate the operation of the contour follower in accordance with the invention.

To mechanize the table look-up process, the eight neighbor pattern of the current pixel forms an eight-bit address or "neighbor code" into eight direction look-up tables. The tables are built for a clockwise traversal of the contour. In operation, the previous position in the contour's traversal, the "from" pixel FP in FIG. 5A, is used to choose one of 8 tables. The look-up tables are constructed specifically to a direction of contour traversal, and are not image specific.

In the example illustrated in FIG. 5A, the direction of traversal is clockwise. Assume that the mask operator of FIG. 4 is centered on the current pixel CP, and that the "from" pixel FP is at direction 8, according to the scheme shown in FIG. 4. The mask operator sees non-zero pixels at direction locations 8, 6, 5, 3, defining an eight bit binary address 10110100, which is equivalent to 180 decimal. An 8-bit address can have 256 different values. Each address is an index into a look-up table (LUT).

In accordance with the invention there are provided eight direction LUTs 82, one for each possible location of the "from" pixel. In the example of FIG. 5A, the "from" pixel FP is at location 8, so the LUT for location 8 would be selected, and the location of the next pixel NP will be determined by the value of the LUT 8 for address 180. This example is illustrated in the following partial listing of LUT 8.

| LUT 8 | |
|---|---|
| Address | NP |
| 0 | 0 |
| ... | |
| 180 | 3 |
| ... | |
| 255 | ... |

In the example given above, the address 180 contains the value 3 indicating that the direction of the next pixel is 3, i.e., NP=3.

Eight direction LUTs are required because the value of the NP will depend not only on the address or neighborhood code value, but also on the location of the "from" pixel FP. To illustrate this, suppose that, in the example of FIG. 5A, the FP is the contour location at direction 3 instead of at direction 8. The address will have the same value, decimal 180. But the next pixel NP clearly must have a different value. Thus, in this example, the LUT for FP 3 is used, i.e., LUT 3.

| LUT 3 | |
| --- | --- |
| Address | NP |
| 0 | 0 |
| ... | |
| 180 | 5 |
| ... | |
| 255 | , , , |

Thus the value returned for address 180 for the NP will be 5. Each of the values for each of the tables can be determined by inspection of the particular pixel values and taking into account the FP.

The direction code returned by the table is then followed to the next pixel in the contour. The pixels are not "adjacent" in the computer memory, and so to form a list of adjacent pixels, the contour must be followed in the same way that a person's eye tracks the edges. The pixel list of the perimeter pixels can by represented by chain codes, e.g., the following list for the exemplary partial perimeter shown in FIG. 5A, where:

| Pixel ID# | NP | x,y |
| --- | --- | --- |
| . | | |
| . | | |
| . | | |
| 51 | 3 | |
| 52 | 4 | |
| 53 | 4 | |
| 54 | 3 | |
| 55 | 2 | |
| 56 | 3 | |
| 57 | 3 | |
| 58 | — | |
| . | | |
| . | | |
| . | | |

The chain codes are not known a priori, but must be produced by the contour follower. The above process is repeated for each contour pixel until the direction table returns a 0 value which signifies a stop condition.

It is possible that a particular contour pixel may be connected to more than two contour branches; this is a multiply-connected contour pixel. Multiply connected contour pixels are encoded in another table 84, also addressed by the 8-neighbor code of the current pixel. If a given neighborhood code defines a multiply-connected pixel, the LUT value for that neighborhood code is 1. If the neighborhood code does not define a multiply-connected pixel, the value of the multiply-connected LUT 84 for that neighborhood code is 0.

The multiply-connected LUT is used to determine whether the value of the CP in the digitized binary-value image input to the contour follower, i.e. the input raster bit map, should be replaced with "0." If the multiply-connected LUT value for a given pixel is "0," the input image pixel value is replaced with "0"; if the pixel is multiply-connected as indicated by the multiply-connected LUT 84, the input image pixel value is not replaced. If a multiple connection is detected, this potentially allows tracing of multiple branched contours. The location of the multiply-connected pixel is saved in a list MP(), where the first detected multiply-connected pixel is at MP(0), the second is at MP(1), and so on. MP() has the x, y pixel locations.

The values of the multiply-connected LUT 84 are determined by inspection of each of the possible 256 values of the neighborhood code. For example, particular values corresponding codes decimal 0–15 are, respectively, 0, 0, 0, 0, 0, 0, 0, 0, 0, 0, 0, 1, 0, 0, 0, 0.

To illustrate the handling of multiply connected pixels, consider the example of FIG. 5A, and suppose that pixel 59 represents a "dead end." The operator mask sees only 8 pixel neighbors, and so cannot see the "dead end" from pixel 55. The traversal then would proceed from pixel 51 to 59, but back tracking over pixels 58, 57 and 56 (represented by phantom lead line numerals 60, 61 and 62), leading to new pixels 63 and 64. If a multiply connected pixel is not detected, then the value of the from pixel FP in the input image raster bit map will be set to zero after the chain code for the current pixel is determined. If a multiply detected pixel is detected, then the input bit map value for the from pixel is not zeroed.

After a multiply-connected pixel is detected, the input image pixel replacement function is switched to another LUT 86 which also detects contour continuation pixels. A continuous contour is one in which there is continuity from one neighboring pixel (the "from" pixel) to the current pixel and thence to the next pixel. The contour continuation pixel replacement LUT 86 is very similar to the multiply-connected LUT 84, except that neighborhood codes for pixels on a contour to be continued (which allows backtracking) also point to replacement values of "1", i.e. indicating that the from pixel value in the input raster bit map should not be set to zero. For example, if the neighborhood code is decimal 34, the contour continuation LUT value is "1", indicating that the from pixel value in the input data should not be set to zero. Thus, the contour continuation table includes the function of detecting multiply-connected pixels, and as well the function of pixel replacement for contour continuation.

The values of the contour continuation LUT 86 are determined by inspection of the 256 possible mask operator configurations. By way of example, the values for this LUT corresponding to decimal neighbor codes 0–15 are 0, 0, 0, 0, 0, 1, 0, 0, 0, 1, 1, 1, 0, 0, 0, 0.

Figure 5B:
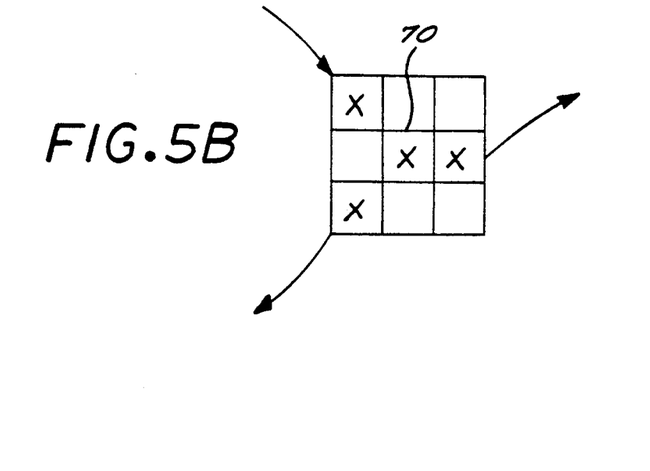

As an example, consider FIG. 5B, which shows a multiply connected pixel 70. In this case, the existence of the multiply connected pixel 70 has been flagged by the multiply-connected LUT 84. The pixel replacement function is switched to the contour continuation LUT 86. The chain codes for these pixels continue to be determined by the direction LUT 82. However, the pixel replacement values for the input raster bit map are determined by the LUT 86. So long as the neighborhood code indicates a contour continuation, the LUT 86 will require that the corresponding pixel value in the raster bit map not be set to zero.

Use of the contour continuation table 86 allows backtracking from dead-end spurs on the contour. Since the operator mask sees only eight pixel neighbors, the replacement value from the multiply-connected LUT and contour continuation LUT serves as bookkeeping for back tracking. The succeeding pixels leading away from the detected multiply-connected pixel are traversed, and pixel replacement values of "1" are returned by the LUT 86, until a "dead end" is reached. The dead end will be detected by the contour continuation pixel LUT 86, and which will return a pixel replacement value of "0". At this point, the direction of traversal will be reversed away from the dead end, until the multiply-connected pixel is again reached. This is the back tracking. This back-tracking to multiply connected pixels allows complicated and noisy contours to be followed.

If the contour is traversed, and no more pixels are found in the contour by the operator mask, the contour follower processs is complete.

Each pixel chain code is also associated with an x, y pair defining the absolute position of that pixel in the rectilinear pixel grid.

A more formal algorithm definition follows:

(1) Initialize i=0, FP(i)=NW, CP(i)=topmost, leftmost, pixel position, where i=contour position index, FP is From Pixel, NW is northwest direction and CP is current pixel.

For each position i pixels along the contour the direction to the next pixel, NP, is determined from the direction look-up tables, Direction_LUT[].

(2) Use FP(i) to select one of eight tables, where FP(i) is the From pixel.

(3) Form the neighborhood code (NC(i)) from the 8 neighbors of CP(i).

(4) Set Next pixel (NP(i)=Direction_LUT[NC(i)].

(5) Replace pixel at CP(i) with Multiply_Connected_Pixel_LUT[NC(i)], or, if a multiply-connected pixel has been detected, with Contour_Continuation_pixel_LUT [NC(i)], until the multiply-connected pixel is again traversed.

(6) Save CP(i) in a points list and save statistics about the contour, such as the size of the contour (number of pixels), area included by the contour (number of pixels), colors inside color images which are registered to the color map and the like.

(7) Set FP(i+1)=CP(i); set CP (i+1)=NP(i); increment i.

(8) Repeat (2) through (7) until each contour pixel has been replaced and CP(i)=CP(0).

Align Building Contours (Step 60)

Figure 6A:
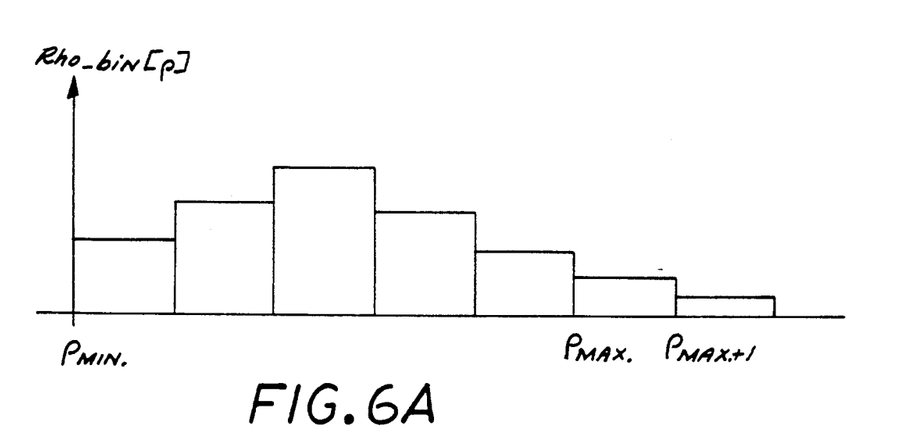
FIG. 6A is a plot illustrative of the parameters Rho versus Theta employed in the Hough Transform for aligning the principal axes of the building contour with the pixel grid.

The Hough transform is used to find the orientation of the principal line segment in a contour. The Hough transform is a well-known technique popularized by Duda and Hart, *Pattern Classification and Screen Analysis*, Wiley, 1973. The Hough transform of the points in an image with coordinates x, y is defined as, $$Rho = x * \cos(Theta) + y * \sin(Theta),$$

where Theta is the orientation angle of a line through point x, y. In the conventional method for determining Theta, the above relation must be evaluated for each x, y point in the input image. The resulting Rho-Theta value pairs are then sorted into an array of fixed size bins, where the number of bins is equal to the maximum value of Theta minus the minimum value of Theta, divided by the bin size, as illustrated in FIG. 6A. The speed of calculation is proportional to the number of x, y points, or pixels, in the image. The accuracy increases as the number of bins increases.

Figure 6B:
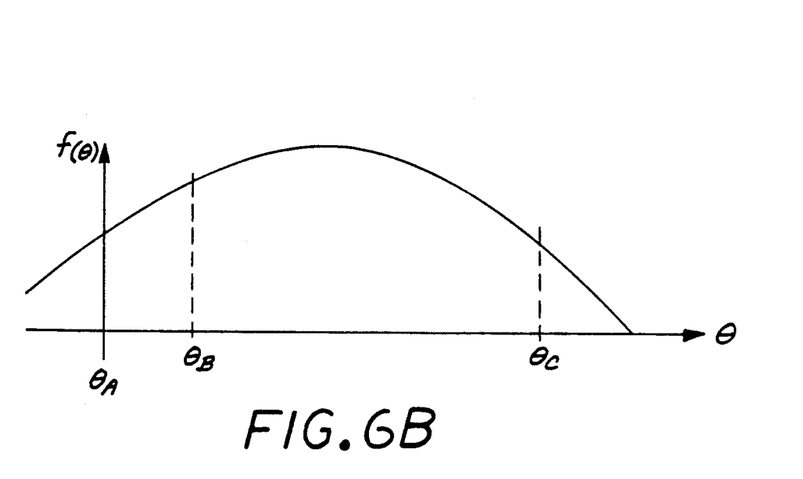
FIG. 6B illustrates the Rho—histogram which is generated for a given Theta value.

In accordance with the invention, the orientation of the contour is found by the following process using the Hough transform. Theta is unkown, but x,y represent the pixel locations of the contour found by the contour follower. A function F(Theta) is defined, which calculates the Rho_histogram [Rho] for each pixel (x,y) in the contour pixel list, where Rho is found from the Hough transform. Theta is a parameter that varies between zero and pi radians. As illustrated in FIG. 6B, the Rho_histogram is composed of an array of Rho_bins, where, if Rho exceeds Rho_bin[Rho], the Rho_bin[Rho] is incremented by one. The value of the function F returned by the function is the largest value of Rho_bin[ ] for the entire contour pixel list, for a specific value of Theta.

Theta is then varied systematically, using Brent's algorithm, to find Theta_max, the value at which F(Theta) is maximized. Brent's algorithm, described in "Algorithms for Minimization Without Derivatives," Richard P. Brent, Prentice-Hall, Englewood Cliffs, N.J., at Chapter 5, can find the maximum value of a function, and so this algorithm can be used to find the maximum value of Rho.

The bin size is varied in the following manner. Since Theta is a parameter between zero and pi radians, the bin limits Theta_A and Theta_C are defined, where initially Theta_A=0 and Theta_B=.618 times pi, and where Theta_C brackets the maximum value of the function F, as shown in FIG. 6C. An uphill search is performed for Theta_C, given Theta_A and Theta_B. Then, the interval in which Theta_max lies is either in [Theta_A, Theta_B] or in [Theta_B, Theta_C]. Brent's algorithm can then be used to rebracket the bins by defining new values for Theta_A and Theta_C, i.e., either the new Theta_A is the old Theta_B, or the new Theta_C is the old Theta_B. The new [Theta_A, Theta_C] bracket Theta_max again, and Theta_B approaches Theta_max within a tolerance epsilon, equal to the absolute value of Theta_max minus Theta_B.

Brent's algorithm is repeated to rebracket the bins until Theta_B is sufficiently close to Theta_max.

Thus, in general the process for finding the orientation of the principle axis of the contour includes calculating Rho using the Hough transform for each pixel along the contour for a specific value of Theta, incrementing the Rho_bin[Rho] by one, and returning the largest value of Rho_bin as F.

The advantages of the present method are: (1) the transform is calculated only for the contour points rather than the entire image, a 1000-fold speedup for a 2000×2000 pixel image, and (2) the Rho-Theta bins vary in size during an iterative convergence process resulting in a 1000-fold increase in accuracy for the same memory size. This iterative convergence process is as follows:

(1) Set Theta=0 radians.

(2) For each point x, y on a contour, compute Rho as above.

(3) Bin the values of Rho into a Rho_histogram having parameters Rho_min, Rho_max, and Rho_bin_size.

(4) Determine Max_Rho, the maximum value of Rho-histogram.

(5) Using the same relation as in (2), set Theta to a value corresponding to Max_Rho.

(6) Using an appropriate convergence function (such as Brent's algorithm) select more restrictive values for the Rho_histogram parameters, and in particular Rho_min and Rho_max.

(7) Repeat (2) through (5) until Max_Rho converges to the desired accuracy.

(8) The value of Theta at which Max_Rho converges is taken to be the orientation of the principal line segment in the contour and hence the orientation of the building.

Calculate Edge Direction Histograms (Step 62)

Figure 7:
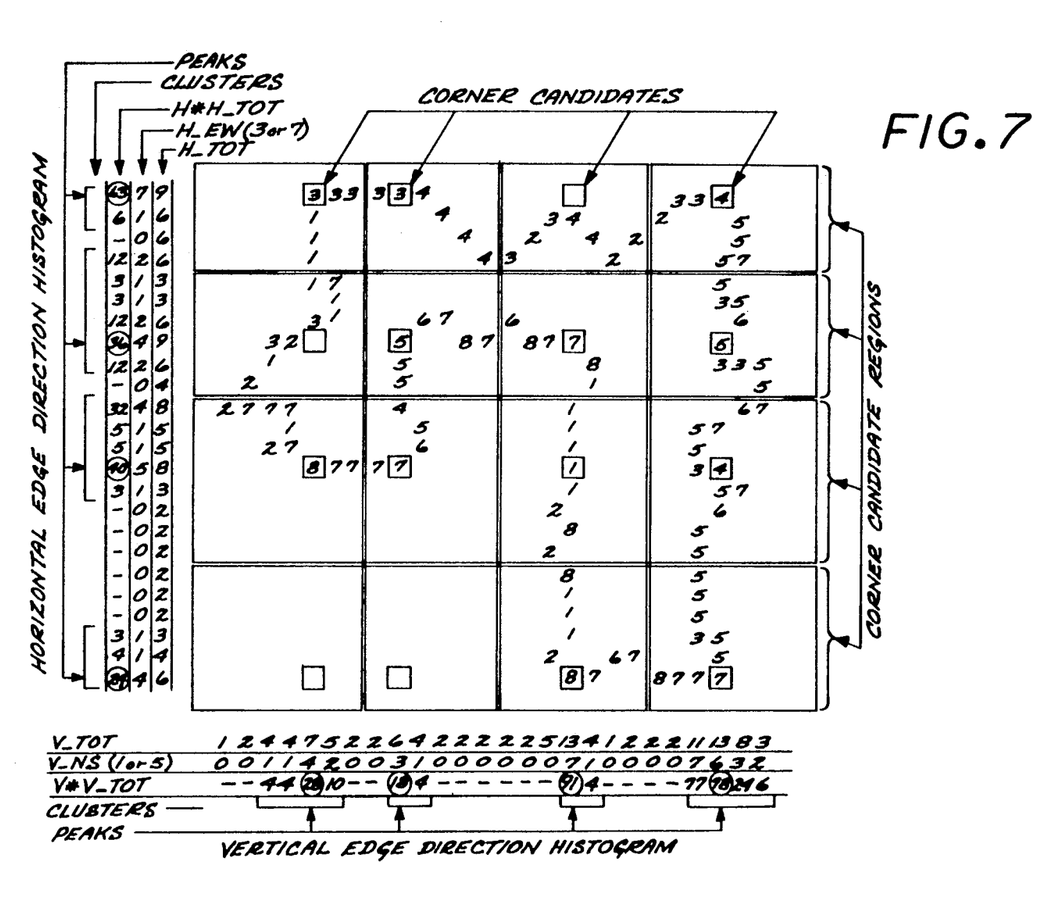
FIG. 7 illustrates the calculation of the edge direction histograms in accordance with the invention.

The result of contour following and aligning the building orientation is the image of a contour in which each contour pixel has a direction number, i.e., a chain code, as shown in FIG. 7. The numbers refer to the eight neighbor mask shown in FIG. 4. For each contour pixel, at x, y, its code number is the direction toward its neighboring contour pixel when tracing the contour clockwise.

(1) The raw horizontal edge histogram H_EW is calculated by counting the number of contour pixels in each row having a horizontal direction, i.e., East or West (codes 3 or 7). The total number of contour pixels in each row, H_TOT, is also counted.

(2) Similarly, the raw vertical edge histogram V_NS is constructed by counting the number of contour pixels in each column with direction North or South (codes 1 or 5). Also, the total number of contour pixels in each column, V_TOT, is counted.

Peaks in the horizontal and vertical edge histogram locate the most likely major straight line segments in the contour. The intersection of these line segments locate candidates for corners of the idealized building perimeter.

(3) The peaks of the raw edge histogram are sharpened prior to locating the candidate corners. Peaks are sharpened in two ways: (a) multiplying the count of pixels with horizontal and vertical directions by the respective total pixel counts, i.e., H_NS * H_TOT and V_EW * V_TOT, (b) clustering contiguous, non-zero histogram elements and selecting the maximum value within each cluster as the peak; clusters are bracketed by one or more consecutive zero elements as shown in FIG. 6.

Second Test of Building Regions: Rectilinearity (Step 64)

The edge histograms of each contour are tested for rectilinear strength. If this test fails, the contour is judged not to be rectilinear and is eliminated from further consideration as a building. This test screens out contours of regions having the color or intensity characteristic of a building but which do not have a rectilinear building shape. A negative test result can be overruled, however, by sufficiently strong evidence from the segmenter step, that is, if there was strong evidence from color and adjacency to the other regions that this region was a building.

The approach is to measure the "peakedness" of a contour's horizontal and vertical edge histograms. Rectilinear contours have high, well defined peaks; whereas nonrectilinear shapes have low, noisy peaks. The measure developed is robust yet easy to calculate; it is the ratio of edge energy at the histogram peaks to the total edge energy.

$$Rectilinear\_concentration = SUM^{ip}[HP(ip) + VP(ip)] / SU^jM[H(i)] + S^jUM[V(j)])$$

where:

$$H(j) = H\_TOT(i) * H\_EW(i);$$

$$V(j) = V\_TOT(j) * V\_NS(j);$$

H_TOT(i) and V_TOT(j) are the total number of pixels in the $i^{th}$ row and $j^{th}$ column of the contour. H_EW(i) and V_NS(j) are the number of pixels in the $i^{th}$ row/$j^{th}$ column having an east-west/north-south direction, respectively. These quantities are calculated in step 62 above.

$$HP(ip) = H\_TOT(ip) * H\_EW(ip);$$

$$VP(jp) = V\_TOT(jp) * V\_NS(jp);$$

ip is the row number of a horizontal histogram peak; jp is column number of a vertical histogram peak; the histogram values at ip and jp are the maximum values within each cluster as determined in step 62(3) above.

Rectilinear_concentration has a value of 1.0 for a perfect rectilinear object. If this ratio is greater than some threshold, then the contour is judged to be rectilinear. In experiments with actual building contours, a good value for this threshold was found to be 0.4.

Hypothesize Building Corners (Step 68)

(1) Locate the corner candidates at the intersections of the projections of the horizontal and vertical edge histogram peaks, shown as small squares in FIG. 7.

(2) Form rectangular regions around each corner candidate by projecting horizontal and vertical lines equidistant from neighboring candidates as shown in FIG. 7.

(3) Trace around the contour to classify each corner candidate as to direction: left-turn, right-turn, up-turn, down-turn, no-turn, or ill-formed. Corners are classified by determining how the contour enters and leaves the rectangular region surrounding each corner candidate. For example, if the contour enters a region from the bottom and leaves to the right, the contour is a right-turn corner. Similarly, if the contour enters at the right and leaves at the left, it is a no-turn candidate and is eliminated as a possible corner. Candidates whose rectangular regions are not intersected by the contour cannot be corners and also are eliminated.

Test Building Corner Candidates (Step 70)

The objective of this step is to test the validity of each corner candidate hypothesized in step 68 above. This is done by attempting to form a closed rectilinear contour with different subsets of the candidate corners. These contours must be consistent with the direction of each corner as determined in step 68. The basic approach is to favor corners formed by the intersection of strong peaks in the edge histograms. The procedure follows:

(1) Select four initial corners corresponding to the four strongest histogram peaks, two from the horizontal and two from the vertical histogram.

(2) Repeat step 68 above, the corner test set. If a closed contour can be formed by these corners, then this set is saved as a valid building perimeter; else the set is discarded as an ill-formed building.

(3) Add untested corners to the test set by selecting the next strongest histogram peak and intersecting it with the existing peak projections. The resulting intersection points constitute the new expanded test set.

(4) Repeat (2) and (3) until no untested corners remain.

(5) Of the valid building contours generated and saved, the one containing the most corners is selected as the building perimeter.

Figure 8:
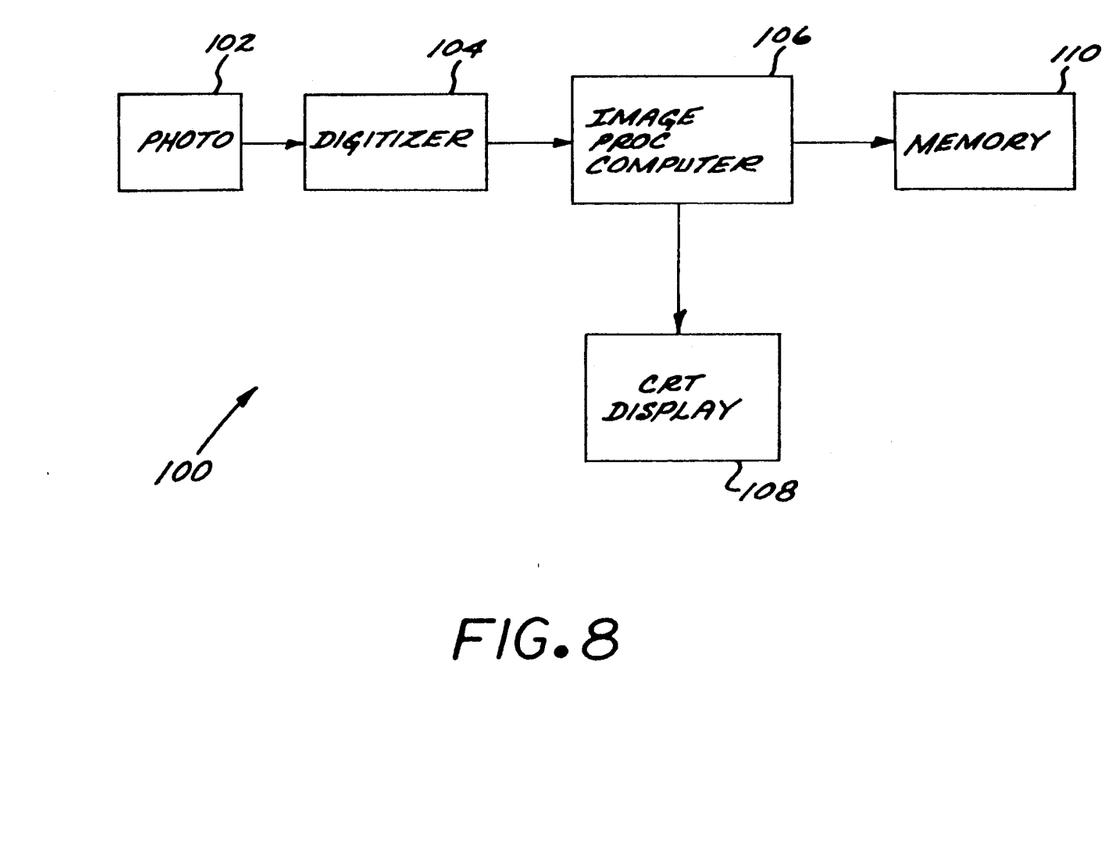
FIG. 8 is a simplified block diagram of a system for implementing the rectilinear object matcher in accordance with the invention.

Referring now to FIG. 8, a simplified block diagram of the hardware components of a system embodying the invention is illustrated. A photograph 102 to be processed in accordance with the invention is digitized by digitizer 104 to provide a digitized version of the photographic image. The digitized version is processed by the image processing computer 106, and the CRT display may be employed to display the processed results. The output of the process is a list of building perimeters which is stored in memory 110.

It is understood that the above-described embodiment is merely illustrative of the possible specific embodiments which may represent principles of the present invention. Other arrangements may readily be devised in accordance with these principles by those skilled in the art without departing from the scope and spirit of the invention.

What is claimed is:

1. A method for extracting the perimeters of buildings from a down-looking terrain image comprising N×M pixels in a rectilinear pixel grid, comprising a sequence of the following steps:
    processing said image to obtain building regions which are candidates for buildings and provide a binary image representation wherein pixels comprising said building regions have a value of one and pixels not comprising said building regions have a value of zero;
    operating on said binary image representation to provide a list of x-y pixel coordinates of the contour of each candidate building region comprising said terrain image;
    aligning the principle axes of each building region contour with respect to the pixel grid of said binary image to provide a list of aligned building region contours;
    calculating vertical and horizontal edge direction histograms of said aligned building region contour list;
    using peaks in said edge histograms to hypothesize corner candidates of said building region pixel coordinate list;
    selecting different combinations of corner candidates, testing each combination as a valid perimeter by attempting to connect the corners of each combination to form a closed, continuous perimeter and discarding each combination which cannot be so connected; and
    selecting as the building perimeter that validated combination of corner candidates with the greatest number of corner candidates.

2. The method of claim 1 further comprising the step of realigning said selected, validated building perimeter to its original orientation in said image.

3. The method of claim 1 further comprising the step of comparing the height of a selected building region against a height threshold and judging said candidate building region not to be a building if the height of the building is close to ground level.

4. The method of claim 1 wherein said step of operating on said binary image representation to provide a list of coordinates of said contour comprises converting said binary image representation into a continuous contour in the form of a list of chain codes and a list of x,y pixel coordinates, wherein each pixel in the contour is assigned a chain code giving the direction of the next pixel in the contour.

5. The method of claim 4 wherein said chain code is assigned by:
    determining a look up table address based on the eight surrounding neighbors of the current pixel;
    selecting one of eight direction look up tables based on the previous pixel position in the contour's traversal;
    obtaining a chain code direction value from the selected address in the selected look up table.

6. The method of claim 5 wherein said step of operating on said binary image representation comprises employing said eight surrounding pixel neighbors of said current pixel to detect a multiply-connected pixel which can connect to more than two contour branches.

7. The method of claim 6 wherein said step of detecting a multiply-connected pixel comprises using the values of said eight surrounding pixel neighbors as the address to a multiply-connected pixel replacement look up table, wherein a particular address which does not return a value indicating that the current pixel is multiply-connected results in replacing the pixel value in said binary image representation with a zero value, and an address which does return a value indicating that the current pixel is multiply-connected results in maintaining said current pixel value in said binary image representation.

8. The method of claim 7 further comprising the step of employing a contour continuation pixel replacement look up table addressed by said address when a multiply-connected pixel has been detected, said contour continuation look up table assuming said pixel replacement function and said multiply-connected pixel detection function and returning a value indicating that the current pixel value should be maintained when either another multiply-connected pixel or a continuous pixel contour is detected, and otherwise replacing said pixel value.

9. The method of claim 1 wherein said step of aligning the principle axes of each building region contour comprises:
    employing the transform Rho=x*cos(Theta)+y*sin(Theta) of the points in an image with coordinates x,y only for the points on said contour rather than the entire image.

10. The method of claim 9 wherein said transform further comprises:
    (i) set Theta=0 radians;
    (ii) compute Rho for each point x,y on said contour;
    (iii) bin the resulting Rho-Theta value pairs into a Rho histogram of bins having the parameters Rho(minimum), Rho(maximum) and Rho(bin size);
    (iv) determine the maximum value of said Rho histogram;
    (v) set Theta to a value corresponding to said maximum value of Rho;
    (vi) select more restrictive values for said parameters;
    (vii) repeat steps (i)-(vi) until said maximum value converges to the desired accuracy; and
    (viii) take the value of Theta at which said maximum value converges as the orientation of said building.

11. The method of claim 1 wherein said step of calculating said histograms comprises:
    calculating the horizontal edge histogram by counting the number horizontal of contour pixels in each row having a horizontal direction; and calculating the vertical edge histogram by counting the number of vertical contour pixels in each column having a vertical direction.

12. The method of claim 11 wherein the peaks of said edge histograms are sharpened by:
   multiplying said number of horizontal and vertical pixels by the respective total number of pixels in the respective rows and columns; and
   clustering contiguous, non-zero histogram elements and selecting the maximum value within each cluster as a peak.

13. The method of claim 1 wherein said step of using peaks in said edge histograms to hypothesize corner candidates comprises locating said corner candidates at the intersections of the projections of the horizontal and vertical edge histogram peaks.

14. The method of claim 13 wherein said step of using peaks in said edge histograms to hypothesize corner candidates further comprises the steps of:
   forming rectangular regions around each corner candidate by projecting horizontal and vertical lines equidistant from neighboring candidates;
   classifying each corner candidate as to direction by determining how the contour enters and leaves said rectangular region surrounding each corner candidate;
   eliminating from consideration any candidates whose rectangular regions are not intersected by said contour, and any candidates wherein the contour enters and leaves said rectangular region along the horizontal or along the vertical.

15. The method of claim 1 further comprising the step of testing the vertical and horizontal dimensions of each building region against a set of prototype building dimensions, and judging a building region not to be a building if the dimensions of the region are too small or too large.

16. The method of claim 1 further comprising the step of testing the peak concentration ratio of said histograms against preset threshold and judging said building region not to be a building if the ratio is less than said threshold.

17. A method for extracting the perimeters of buildings from a down-looking terrain image comprising NxM pixels in a rectilinear pixel grid, comprising a sequence of the following steps:
   processing said image to obtain building regions which are candidates for buildings and provide a binary image representation wherein pixels comprising said building regions have a value of one and pixels not comprising said building regions have a value of zero;
   testing the vertical and horizontal dimensions of each building region against a set of prototype building dimensions, and judging a building region not to be a building if the dimensions of the region are too small or too large;
   operating on said binary image representation to provide a list of x-y pixel coordinates of the contour of each candidate building region comprising said terrain image;
   aligning the principle axes of each building region contour with respect to the pixel grid of said binary image to provide a list of aligned building region contours;
   calculating vertical and horizontal edge direction histograms of said aligned building region contour list;
   testing the peak concentration ratio of said histograms against preset threshold and judging said building region not to be a building if the ratio is less than said threshold;
   using peaks in said edge histograms to hypothesize corner candidates of said building region pixel coordinate list;
   selecting different combinations of corner candidates, testing each combination as a valid perimeter by attempting to connect the corners of each combination to form a closed, continuous perimeter and discarding each combination which cannot be so connected; and
   selecting as the building perimeter that validated combination of corner candidates with the greatest number of corner candidates.

18. The method of claim 17 further comprising the step of realigning said selected, validated building perimeter to its original orientation in said image.

19. The method of claim 17 further comprising the step of comparing the height of a selected building region against a height threshold and judging said candidate building region not to be a building if the height of the building is close to ground level.

20. The method of claim 17 wherein said step of operating on said binary image representation to provide a list of coordinates of said contour comprises converting said binary image representation into a continuous contour in the form of a list of chain codes and a list of x,y pixel coordinates, wherein each pixel in the contour is assigned a chain code giving the direction of the next pixel in the contour.

21. The method of claim 20 wherein said chain code is assigned by:
   determining a look up table address based on the eight surrounding neighbors of the current pixel;
   selecting one of eight direction look up tables based on the previous pixel position in the contour's traversal;
   obtaining a chain code direction value from the selected address in the selected look up table.

22. The method of claim 17 wherein said step of aligning the principle axes of each building region contour comprises:
   employing the transform Rho=x*cos(Theta)+y*sin(Theta) of the points in an image with coordinates x,y only for the points on said contour rather than the entire image.

23. The method of claim 22 wherein said transform further comprises:
   (i) set Theta=0 radians;
   (ii) compute Rho for each point x,y on said contour;
   (iii) bin the resulting Rho-Theta value pairs into a Rho histogram of bins having the parameters Rho(minimum), Rho(maximum) and Rho(bin size);
   (iv) determine the maximum value of said Rho histogram;
   (v) set Theta to a value corresponding to said maximum value of Rho;
   (vi) select more restrictive values for said parameters;
   (vii) repeat steps (i)–(vi) until said maximum value converges to the desired accuracy; and
   (viii) take the value of Theta at which said maximum value converges as the orientation of said building.

24. The method of claim 17 wherein said step of calculating said histograms comprises:

calculating the horizontal edge histogram by counting the number horizontal of contour pixels in each row having a horizontal direction; and calculating the vertical edge histogram by counting the number of vertical contour pixels in each column having a vertical direction.

25. The method of claim 24 wherein the peaks of said edge histograms are sharpened by:

multiplying said number of horizontal and vertical pixels by the respective total number of pixels in the respective rows and columns; and clustering contiguous, non-zero histogram elements and selecting the maximum value within each cluster as a peak.

26. The method of claim 17 wherein said step of using peaks in said edge histograms to hypothesize corner candidates comprises locating said corner candidates at the intersections of the projections of the horizontal and vertical edge histogram peaks.

27. The method of claim 26 wherein said step of using peaks in said edge histograms to hypothesize corner candidates further comprises the steps of:

forming rectangular regions around each corner candidate by projecting horizontal and vertical lines equidistant from neighboring candidates;

classifying each corner candidate as to direction by determining how the contour enters and leaves said rectangular region surrounding each corner candidate;

eliminating from consideration any candidates whose rectangular regions are not intersected by said contour, and any candidates wherein the contour enters and leaves said rectangular region along the horizontal or along the vertical.

28. A system for extracting the perimeters of buildings from a down-looking terrain image, comprising:

means for digitizing said image to form an image representation comprising NxM pixels in a rectilinear pixel grid;

an image processing means for processing said image representation, comprising:

means for obtaining building regions which are candidates for buildings and providing a binary image representation wherein pixels comprising said building regions have a value of one and pixels not comprising said building regions have a value of zero;

means for operating on said binary image representation to provide a list of x-y pixel coordinates of the contour of each candidate building region comprising said terrain image;

means for aligning the principle axes of each building region contour with respect to the pixel grid of said binary image;

means for calculating vertical and horizontal edge direction histograms of said aligned building region contour list;

means employing peaks in said histograms for hypothesizing corner candidates of said building region pixel coordinates list;

means for selecting different combinations of corner candidates, testing each combination as a valid perimeter by attempting to connect the corners of each combination to form a closed, continuous perimeter and discarding each combination which cannot be so connected; and means for selecting as the building perimeter that validated combination of corner candidates with the greatest number of corner candidates;

means for displaying said selected building perimeter.

29. The system of claim 28 wherein said processing means further comprises means for realigning said selected building perimeter to its original orientation in said image.

30. The system of claim 28 wherein said processor further comprises means for comparing the height of a selected building region against a height threshold and judging said candidate building region not to be a building if the height of the building is close to ground level.

* * * * *